US010794265B2

(12) United States Patent
Dumas et al.

(10) Patent No.: US 10,794,265 B2
(45) Date of Patent: Oct. 6, 2020

(54) VENTING TANK AND AUTOMOTIVE VEHICLE COMPRISING SUCH A TANK

(71) Applicant: ILLINOIS TOOL WORKS INC., Glenview, IL (US)

(72) Inventors: Pascal Dumas, Cluny (FR); Serge Iafrate, Montmerle sur Saone (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 198 days.

(21) Appl. No.: 15/760,698

(22) PCT Filed: Aug. 30, 2016

(86) PCT No.: PCT/US2016/049471
§ 371 (c)(1),
(2) Date: Mar. 16, 2018

(87) PCT Pub. No.: WO2017/053030
PCT Pub. Date: Mar. 30, 2017

(65) Prior Publication Data
US 2018/0266306 A1 Sep. 20, 2018

(30) Foreign Application Priority Data

Sep. 25, 2015 (FR) ...................................... 15 59064

(51) Int. Cl.
*B01D 19/00* (2006.01)
*F01P 11/02* (2006.01)
(52) U.S. Cl.
CPC ........ *F01P 11/029* (2013.01); *B01D 19/0042* (2013.01); *F01P 11/028* (2013.01); *F01P 11/0285* (2013.01)

(58) Field of Classification Search
CPC .......... B01D 19/00–0495; F01P 11/029; F01P 11/028; F01P 11/0285; F01P 11/00–20; F01M 13/00–06
(Continued)

(56) References Cited

U.S. PATENT DOCUMENTS 4,723,596 A * 2/1988 Spindelboeck ........ F01P 11/029
123/41.51
8,448,696 B2 5/2013 Johnston
(Continued)

FOREIGN PATENT DOCUMENTS

CN 1662731 A 8/2005
CN 201747449 U 2/2011
(Continued)

OTHER PUBLICATIONS

PCT, International Search Report and Written Opinion, International Application No. PCT/US2016/049471; dated Nov. 3, 2016, 10 pages.

*Primary Examiner* — T. Bennett McKenzie
(74) *Attorney, Agent, or Firm* — Thompson Hine LLP

(57) ABSTRACT

A venting tank (1) for a cooling system of a motor vehicle includes a main wall (3), which defines an inner venting volume (V) of the venting tank, the main wall including a bottom (5) and a cover (7) opposite one another, an intake (45, 47, 49, 51, 53) for a heat transfer fluid to be vented within the interior venting volume, and a discharge (55, 57) for discharging the vented heat transfer fluid outside the inner venting volume. This venting tank (1) further includes a heat transfer fluid duct (19), which crosses through the cover (7) and the bottom (5) and includes an inner segment (29) extending within the inner venting volume (V) from the cover (7) to the bottom (5) and whereof an inner volume (V29) is separated from the inner venting volume.

11 Claims, 2 Drawing Sheets

(58) Field of Classification Search
USPC ........... 96/155–220; 95/241–266; 123/41.54, 123/41.86, 90.57
See application file for complete search history.

(56) References Cited

U.S. PATENT DOCUMENTS

2005/0081716 A1    4/2005  Morita
2015/0144079 A1*  5/2015  Iafrate .................... F01P 11/028
                                                                   123/41.01

FOREIGN PATENT DOCUMENTS

| | | | |
|---|---|---|---|
| CN | 23403945 U | 1/2014 | |
| EP | 0171623 | 2/1986 | |
| FR | 2866064 A1 | 8/2005 | |
| FR | 2993513 A1 * | 1/2014 | ............ F01P 11/028 |
| JP | S5357142 | 5/1978 | |
| JP | H0913964 | 1/1997 | |

* cited by examiner

VENTING TANK AND AUTOMOTIVE VEHICLE COMPRISING SUCH A TANK

FIELD OF THE INVENTION

The present invention concerns a venting tank adapted to be fitted to a cooling system of an automotive vehicle. The invention also concerns an automotive vehicle equipped with a cooling system comprising such a venting tank.

BRIEF SUMMARY OF THE INVENTION

Conventionally, a vehicle cooling system comprises a heat transfer fluid circuit formed by various pipes, also called hoses, which extend close to the engine and radiator of the automotive vehicle. The system also comprises a venting tank, also called an expansion tank, delimiting an inner volume intended to receive the heat transfer fluid to be degassed. The flow of heat transfer fluid circulating in the venting tank may amount to around 8 liters per minute (l/min).

In practice, the venting tank has two main functions. The first is to allow the thermal expansion of the heat transfer fluid by adding a volume of air above the maximum level of the liquid in the tank. The second is to degas the heat transfer circuit. In fact, if the circuit is free from gas before first start-up of the vehicle, there is a risk of gasifying the circuit when the vehicle is in operation, for example because of possible slight leaks at the inlet to the water pump, wear on the cylinder head gasket, or any hot points in the engine. Thus, by diverting the heat transfer fluid to the venting tank, it can be degassed.

In the case of a specific cooling system adapted to another part of the vehicle, the operating temperature of which is lower than that of the engine itself, for example the battery, the volume of the venting tank is reduced in order to take into account this lower operating temperature. The heat transfer fluid may be circulated by an electric pump such that the flow of heat transfer fluid circulating in the cooling system may exceed 15 l/min.

In this situation, if the entire flow of heat transfer fluid is to pass through the venting tank, an undesirable effect of gasifying the heat transfer fluid is likely to occur at the outlet from the venting tank because of the low volume of the latter and the turbulence induced by the high flow rate. In addition, this configuration is liable to generate noise, in particular in the case of a high cooling demand, such that the flow of heat transfer fluid is high. Thus such a cooling system is relatively noisy and its venting tank inefficient, in particular when fitted to a secondary low-temperature cooling circuit of an internal combustion engine or a cooling circuit for the power supply batteries of an electric motor in the case of an automotive vehicle with electric drive.

To remedy these drawbacks, a bypass hose may be provided for the heat transfer fluid, mounted branching from the venting tank such that only a fraction of the flow passes through the venting tank. However, installation of such a hose causes additional costs of production and installation of the hose, and increases the space required for the cooling system. Also, such a configuration would increase the risk of breakdown insofar as the bypass hose and its connecting means would be subject to leaks.

The invention therefore aims to remedy the above-mentioned drawbacks and its object is a new venting tank which is reliable, compact, quiet and effective, and also easy to produce and install.

The object of the invention is a venting tank for a cooling system of an automotive vehicle, the venting tank comprising a main wall which defines an inner venting volume of the venting tank, the main wall comprising a bottom and a cover opposite one another, intake means for a heat transfer fluid to be degassed within the inner venting volume, and means for discharging the degassed heat transfer fluid outside the inner venting volume. According to the invention, the venting tank further comprises a heat transfer fluid duct which passes through the cover and the bottom and comprises an inner segment extending within the inner venting volume from the cover to the bottom, and an inner volume of which is separated from the inner venting volume.

Thanks to the invention, only a fraction of the flow of the heat transfer fluid is conducted into the inner venting volume of the venting tank to be degassed, the other fraction passing through the inner segment without being degassed. The inner segment thus constitutes an "integral bypass" inside the tank to reduce the flow of fluid into the inner venting volume of the latter, avoiding any undesirable gasifying effect and reducing the noise, without however complicating the installation and production, or taking up excessive space. Furthermore, the inner segment is arranged inside the venting tank which is itself sealed and does not therefore constitute an additional leakage risk, such that the tank is particularly reliable.

According to other advantageous characteristics of the invention taken in isolation or in combination:

The inner segment has a tubular shape and has a cross-section that defines an outer perimeter, the inner segment being separated from the main wall over at least three-quarters of the outer perimeter.

The inner segment comprises:
  an upper tube which comprises a first end, the upper tube extending within the inner venting volume from the cover to the first end, and
  a lower tube which comprises a second end, the lower tube extending within the inner venting volume from the bottom to the second end, the upper tube and the lower tube being connected to one another by means of the first end and the second end.

The upper tube is integral with the cover and the lower tube is integral with the bottom, the cover being attached to the bottom.

The inner segment comprises tight connecting means between the first end and the second end.

The intake means comprise:
  a transfer orifice which is arranged in the inner segment near the cover,
  a dispensing orifice which opens in the inner venting volume near the bottom,
  a supply duct which connects the transfer orifice to the dispensing orifice.

The supply duct comprises:
  an intermediate elbow which is positioned near the cover,
  a transfer tube which connects the transfer orifice to the intermediate elbow and which has a cross-section whose diameter is smaller than a cross-section of the inner segment, and
  a plunger tube which extends from the intermediate elbow to the dispensing orifice.

The discharge means comprise:
  a discharge orifice which is located in the bottom, and
  a discharge duct, which connects the discharge orifice to the duct outside the inner venting volume.

The venting tank comprises a partition inserted between the intake means and the discharge means, in the inner venting volume.

The invention also concerns an automotive vehicle comprising a cooling system for one or more elements of the vehicle, said system in turn comprising a heat transfer fluid circuit and a venting tank for the heat transfer fluid as described above.

BRIEF DESCRIPTION OF THE DRAWINGS

The invention will be better understood from reading the description below, given merely as a non-limitative and non-exhaustive example, with reference to the attached drawings in which.

DETAILED DESCRIPTION OF THE INVENTION

The venting tank 1 shown in FIGS. 1 to 4 is designed to be integrated in a heat transfer fluid network of an automotive vehicle. In particular, this venting tank 1 may be integrated in the heat transfer fluid circuit of one or more elements, the operating temperature of which is lower than that of an internal combustion engine of the automotive vehicle. For example, the tank 1 is adapted to be fitted to a cooling system of a battery or another element such as a vehicle heat exchanger, this cooling system itself comprising a heat transfer fluid circuit arranged close to the battery or the element concerned, and close to a radiator of the vehicle. The battery concerned may be a conventional battery associated with an internal combustion engine of the vehicle, or a main supply battery for an electric motor of the vehicle in the case where the vehicle is a hybrid vehicle or a so-called electric vehicle, i.e. a vehicle which is driven by an electric motor and not by an internal combustion engine. Alternatively, the tank 1 may be fitted to a cooling system of an internal combustion engine, and in particular a secondary low-temperature circuit. The vehicle concerned here may be for example a car, a bus, a coach or a truck, i.e. a land-based vehicle. Alternatively, the vehicle may be a marine vehicle of the motor boat type, an aircraft of the motorized aircraft type, or a rail vehicle. The heat transfer fluid used in the cooling system and in the tank 1 is for example a cooling liquid of the glycolated water type. Depending on the application of the venting tank 1, any known suitable heat transfer fluid may be used.

The tank 1 comprises a main wall 3 which forms a vessel and defines an inner venting volume V of the tank 1, provided for degassing the heat transfer fluid. The wall 3 is preferably made of molded plastic material and comprises two main portions joined together, namely:
- a bottom 5 which forms a lower portion of the main wall 3 and delimits the bottom of the inner venting volume V, and
- a cover 7 which forms an upper part of the wall 3 and delimits the top of the inner venting volume V.

Figure 1:
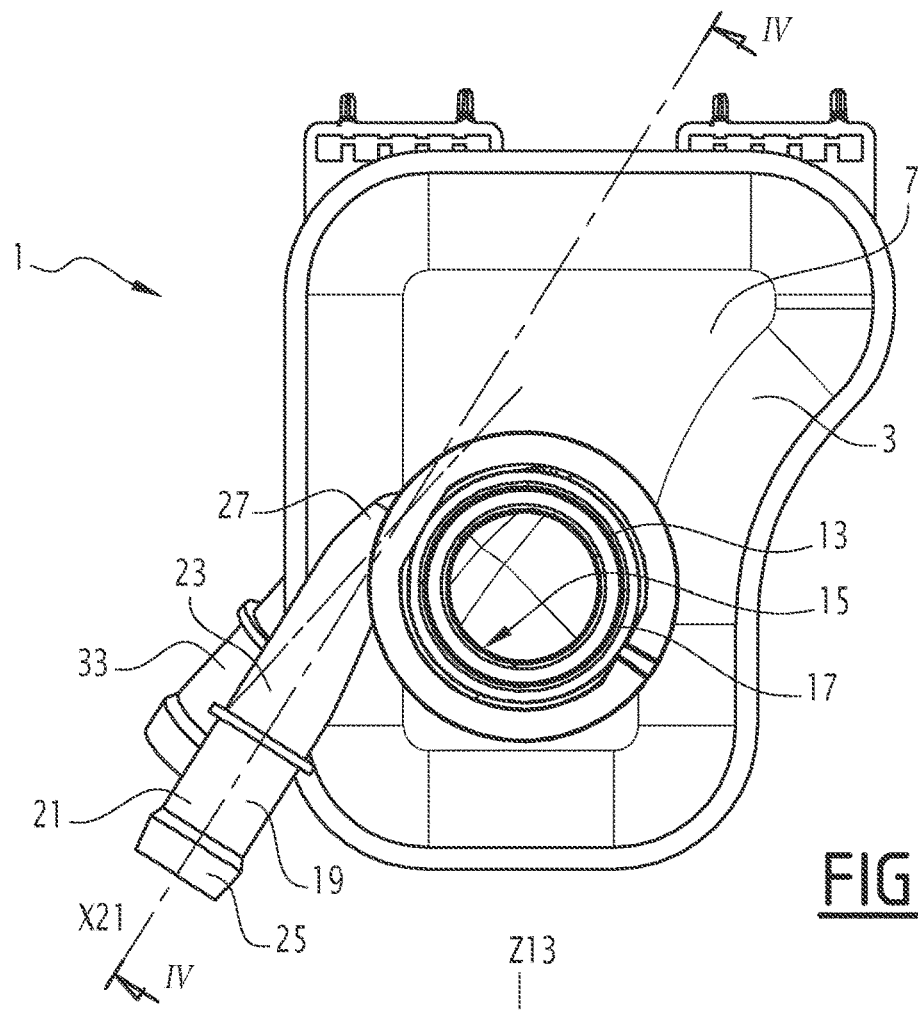
FIG. 1 is a view from above a venting tank according to the invention.
Figure 2:
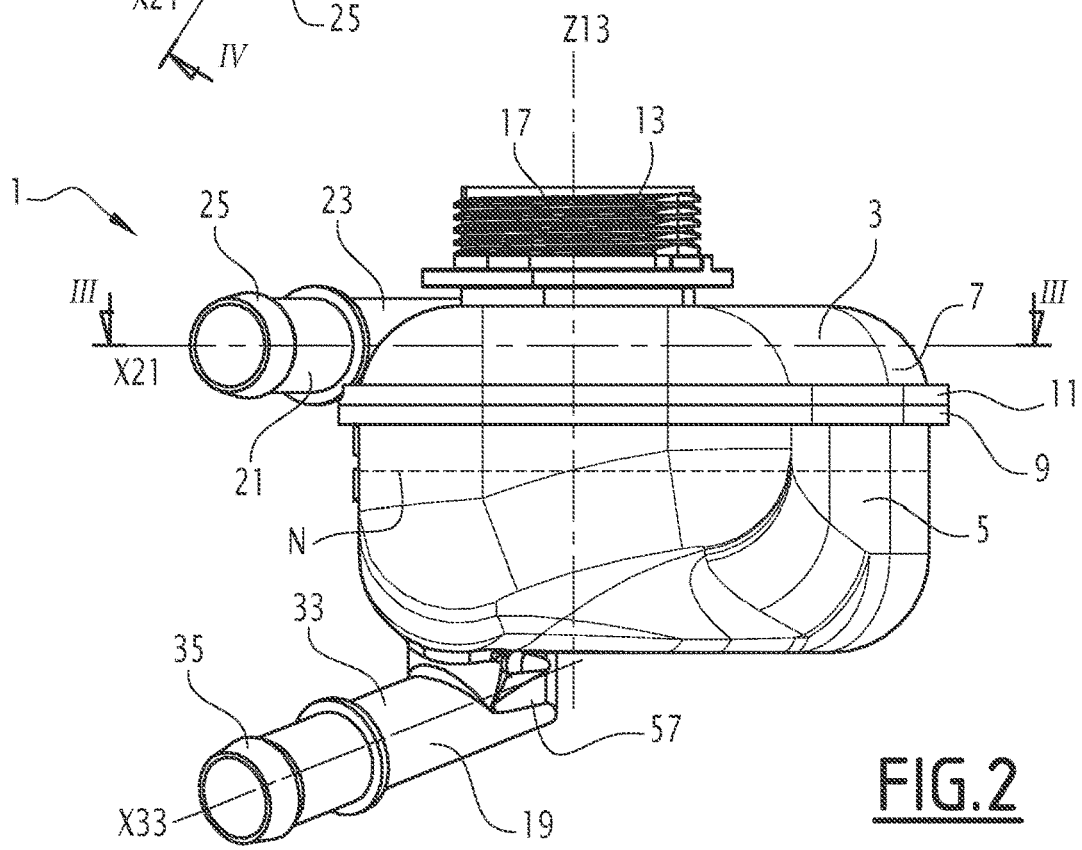
FIG. 2 is a view from the side of the venting tank of FIG. 1.

For the sake of simplicity, the present description is oriented relative to FIG. 2 where the terms "upper" and "top" correspond to an axial direction directed toward the top part of FIG. 2, and in this case in the direction of the cover 7, while the terms "lower" and "bottom" correspond to an opposite axial direction, in this case oriented toward the bottom 5. In fact, in operation, the tank 1 is designed to be arranged according to the orientation of FIG. 2, i.e. the cover 7 is situated aligned with and above the bottom 5, such that gravity is oriented substantially from top to bottom on FIG. 2. The cover 7 and the bottom 5 are thus arranged opposite each other within the tank 1.

The bottom 5 forms a pocket with an upper edge 9 which delimits an upper portion of the bottom 5 surrounding a part of the inner venting volume V. The upper edge 9 extends in one plane. In the same way, the cover 7 comprises a lower edge 11 of shape corresponding to that of the upper edge 9 and surrounding the inner venting volume V. The cover 7 also takes the form of a pocket which caps and closes the bottom 5, so that the bottom 5 and the cover 7 contain the inner venting volume V. The cover 7 is preferably welded to the bottom 5, the edge 9 being welded to the edge 11. Other methods of joining the cover 7 to the bottom 5 may be considered, as long as the cover 7 together with the bottom 5 forms a sealed wall 3 which is able to contain the heat transfer fluid of the cooling system, the inner venting volume V being the zone in which this heat transfer fluid is degassed.

Conventionally, the inner venting volume V is intended to receive a quantity of heat transfer fluid which rests on the bottom 5. It is provided that the heat transfer fluid reaches a nominal level N which is visible in FIG. 2, the part of the inner venting volume V situated above the nominal level N constituting an expansion volume occupied by a gas which is formed by degassing of the heat transfer fluid situated in the part of the inner venting volume V below the nominal level N, and air. The nominal level N is indicated for example by a graduation provided on the wall 3 and not shown. The heat transfer fluid is contained in the volume V under pressure in order to promote its degassing, and is in circulation at least sequentially during operation of the vehicle.

The tank 1 also comprises a neck 13 arranged on the cover 7 which defines an access orifice 15 through the cover 7 to the inner venting volume V. The neck 13 extends outside the main wall 3 and protrudes upward along an axis Z13 substantially orthogonal to the edges 9 and 11. The neck 13 is provided to receive a degassing valve (not shown), which may for example be screwed onto an external thread 17 of the neck 13. The access orifice 15 is located in the topmost portion of the cover 7 in relation to gravity.

The tank 1 comprises a heat transfer fluid duct 19 which is tubular in form and bent, advantageously with a circular cross-section which remains substantially constant over the entire length of the duct 19.

The duct 19 comprises an intake segment 21 which extends along an axis X21 parallel to the extension plane of the edges 9 and 11. The intake segment 21 extends outside the inner venting volume V and the main wall 3 and is connected to the latter by the cover 7. The intake segment 21 has an open coupling end 25 designed to be connected to a hose (not shown) which supplies heat transfer fluid to the tank 1. The duct 19 also comprises a transverse segment 23 extending the intake segment 21 coaxially with the latter. The transverse segment 23 passes through the cover 7 so it is partly contained in the inner venting volume V. In this case, an upper portion of the transverse segment 23 extends outside the wall 3, and a lower portion extends inside the wall 3. The duct 19 then comprises an elbow 27 which defines a 90° angle with the transverse segment 23.

An inner segment 29 of the duct 19 extends along axis X29 from the elbow 27 such that the inner segment 29 is perpendicular to the intake segment 21 and to the transverse segment 23. The inner segment 29 extends within the inner venting volume V from the cover 7 to the bottom 5, as can be seen from FIG. 4. The inner volume V29 of the inner segment is separated from the inner venting volume V.

The duct 19 also comprises a second elbow 31 which extends the segment 29 from the bottom 5 outside the inner venting volume V and the wall 3. The elbow 31 defines an obtuse angle. Thus the duct 19 also passes through the bottom 5 downstream of the inner segment 29 and upstream of the elbow 31.

Figure 3:
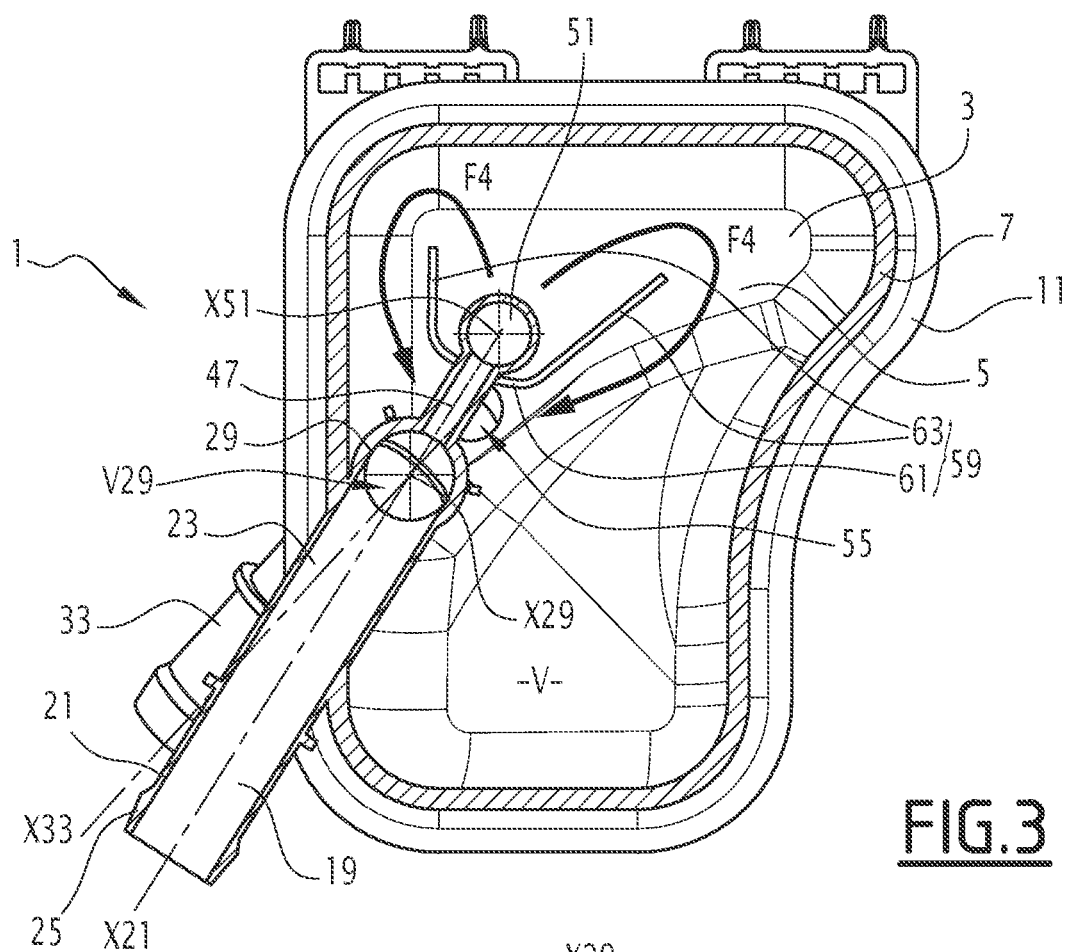
FIG. 3 is a section along section line III-III of FIG. 2.

The duct 19 finally comprises a discharge segment 33 which extends outside the main wall 3 along an axis X33 which intersects the axis X29. The discharge segment 33 extends from the elbow 31. The duct 19 also comprises an open coupling end 35 which terminates the discharge segment 33, in order to allow connection of a hose for draining the heat transfer fluid from the tank 1, which hose is not shown in the figures. The discharge segment 33 is oriented along the bottom 5, slightly obliquely relative to the plane defined by the edge 9 and the edge 11. Axes X21, X29 and X33 are oriented virtually coplanar, the intake segment 21 and the discharge segment 33 being directed substantially in the same direction, obliquely and close to the above-mentioned discharge segment 33. In practice, segments 21 and 23 diverge slightly from each other from the inner segment 29 as shown in FIG. 3. In general, it can be considered that the duct 19 has a U-shaped profile.

Figure 4:
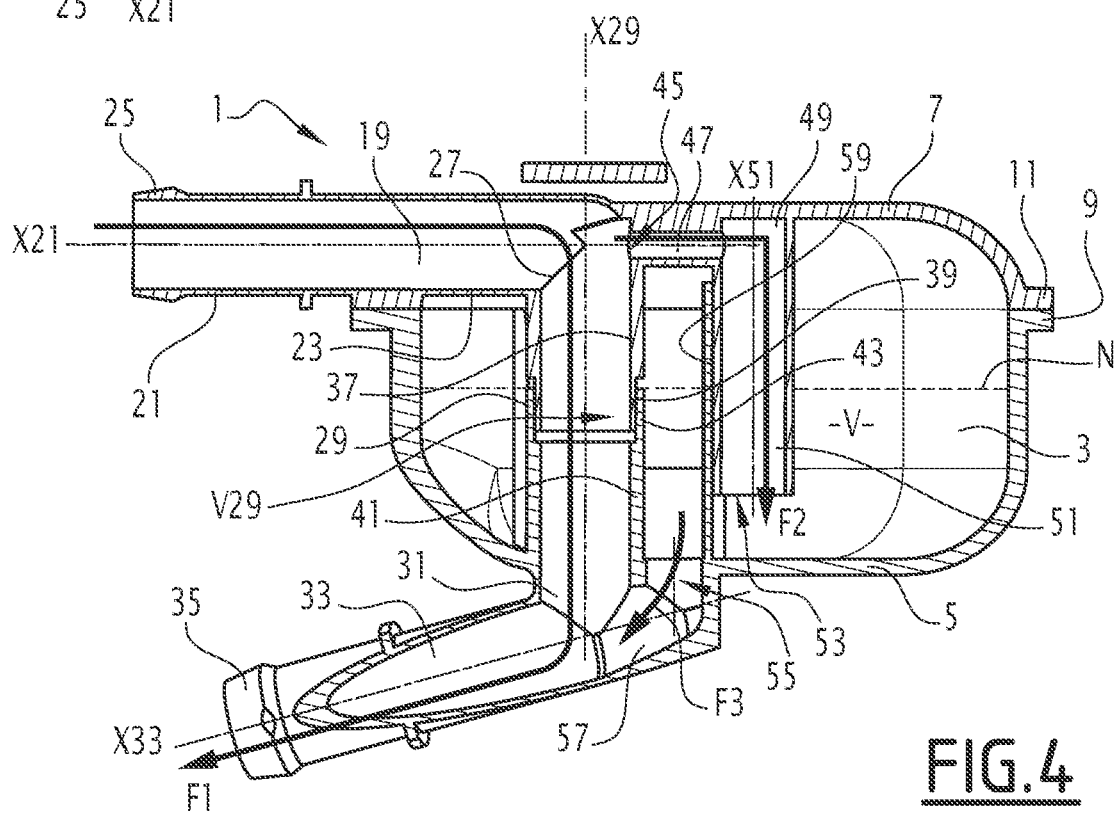
FIG. 4 is a section along section line IV-IV of FIG. 1.

In practice, the tank 1 is connected to the heat transfer fluid circuit of the cooling system via its coupling ends 25 and 35. The heat transfer fluid circulates inside the duct 19 along arrow F1, as shown in FIG. 4. In this case, the heat transfer fluid enters the intake segment 21 and circulates in the inner segment 29 then in the discharge segment 33.

The inner segment 29 has a rectilinear profile. The cross-section of the segment 29, i.e. a section defined orthogonally relative to axis X29, thus defines a substantially circular outer perimeter. The inner segment 29 is separated from the main wall 3 over at least three-quarters of this outer perimeter, or perhaps over the entirety of the latter. In practice, the inner segment 29 forms a tube, the cross-section of which is substantially identical to the cross-section of segment 21 and segment 33 which themselves form rectilinear tubes. In particular, segments 21, 29 and 33 have the same diameter. The inner segment 29 crosses the inner venting volume V from top to bottom, passing close to edges 9 and 11.

The tank 1 comprises an upper tube 37 which itself comprises a first end 39, the upper tube 37 extending within the inner venting volume V from the cover 7 to the first end 39. The upper tube 37 thus forms a first portion of the inner segment 29. Similarly, the tank 1 comprises a lower tube 41 which itself comprises a second end 43, such that the lower tube 41 extends within the inner venting volume V from the bottom 5 to the second end 43. The tubes 37 and 41 are coaxial with axis X29 and connected to each other via their respective ends 39 and 43. As illustrated in FIG. 4, the upper tube 37 is guided inside the lower tube 41. In this case, the outer circumference of the upper tube 37 is reduced from the first end 39 such that the latter can be inserted inside the second end 43 of the lower tube 41, the inner diameter of the lower tube 41 being itself increased such that the first end 39 can be received in the lower tube 41. The first end 39 and the second end 43 thus form a connection between the tubes 37 and 41. The outer diameter of the end 39 and the inner diameter of the second end 43 are preferably adapted such that the upper tube 37 is connected to the lower tube 41 in a sealed fashion. The end 39 and the end 43 are thus sleeved one inside the other so as to form a tight connection between the tube 37 and the tube 41, such that the heat transfer fluid does not draw in air through this connection. As a variant, sealing means may be provided to prevent any risk of leakage at this connection point. In particular, the upper tube 37 may be welded to the lower tube 41 in order to seal the connection between the first end 39 and the second end 43.

Preferably, the upper tube 37 and the intake segment 21, the transverse segment 23, the elbow 27 and the coupling end 25, are formed integrally with the cover 7 and form an upper assembly of the tank 1 which may be produced by molding or by injection. Similarly, the lower tube 41 and the elbow 31, the discharge segment 33 and the coupling end 35, are formed integrally with the bottom 5 so as to form a lower assembly of the tank 1 which may also be produced by molding or by injection. The tank 1 is thus particularly simple and cheap to produce. This method of production in two upper and lower assemblies limits the risk of leaks, so that the tank 1 is particularly reliable and robust.

The tank 1 also comprises a transfer orifice 45 which can be seen on FIG. 4 and is arranged in the inner segment 29, in particular in the tube 37, close to the cover 7. The tank 1 also comprises a transfer tube 47 which extends from the transfer orifice 45 coaxially with axis X21. This transfer tube 47 has a cross-section, the diameter of which is smaller than that of the cross-section of the inner segment 29, and more generally of the duct 19. The diameter of the transfer tube 47 is such that the flow of heat transfer fluid circulating in the inner segment 29 is different from that circulating in the transfer tube 47. The dimensioning of the segment 29 and the tube 47 allows adjustment of the relative flows between the inner segment 29 and the tank 1. The transfer tube 47 advantageously extends along the cover 7.

The tank 1 then comprises an intermediate elbow 49 arranged against the cover 7, or at least close to the cover 7. The intermediate elbow 49 extends the transfer tube 47 such that the latter connects the transfer orifice 45 to the intermediate elbow 49. The intermediate elbow 49 forms a right angle.

The tank 1 also comprises a plunger tube 51 which extends along an axis X51 orthogonal to axis X21 and parallel to axis X29. The plunger tube 51 extends the elbow 49 in the direction of the bottom 5. The plunger tube 51 preferably has a cross-section of diameter greater than that of the transfer tube 47, but nonetheless smaller than that of the inner segment 29. The plunger tube 51 terminates in a dispensing orifice 53 of the tank 1 which opens into the inner venting volume V, close to and spaced from the bottom 5. The plunger tube 51 thus extends from the intermediate elbow 49 to the dispensing orifice 53, such that the lower portion of the plunger tube 51 is situated below the nominal level N so that it can be immersed in the actual heat transfer fluid. Thus the plunger tube 51 extends from the cover 7 at least beyond, i.e. below, the plane defined by the edges 9 and 11, and beyond, i.e. below, the nominal level N of the tank 1. The dispensing orifice 53 is thus immersed in the heat transfer fluid contained in the inner venting volume V.

Definitively, the intermediate elbow 49, the transfer tube 47 and the plunger tube 51 form a supply duct which connects the transfer orifice 45 to the dispensing orifice 53. Preferably, the supply duct 47, 49 and 51 is formed integrally with the cover 7 such that it forms part of the above-mentioned upper assembly. The transfer orifice 45, the supply duct 47, 49 and 51, and the dispensing orifice 53 form intake means for the heat transfer fluid to be degassed inside the inner venting volume V. In practice, part of the heat transfer fluid drawn into the duct 19 via the coupling end 25 is extracted at the transfer tube 47, so as to be diverted to the intake pipe 47, 49 and 51 in order to supply the inner venting volume V of the tank 1 with heat transfer fluid for degassing of the latter. This part of the heat transfer fluid thus progresses along arrow F2 shown in FIG. 4 in the intake pipe 47, 49 and 51 and is discharged into the bottom of the inner venting volume V.

An orifice 55 for discharging heat transfer fluid outside the inner venting volume V is located in the bottom 5. This discharge orifice 55, which is shown in both FIG. 3 and FIG. 4, is offset relative to the axis X51 of the plunger tube 51 and is therefore not placed opposite the dispensing orifice 53. The discharge orifice 55 is advantageously placed in the lowest part of the bottom 5 so as to facilitate discharge of the heat transfer fluid contained in the inner venting volume V by means of gravity. Preferably, the orifice 55 is arranged in the bottom 5 between axis X51 and axis X29. A discharge duct 57 connects the discharge orifice 55 to the discharge segment 33 of the duct 19 outside the inner venting volume V. The discharge duct 57 thus extends below the bottom 5 outside the wall 3 and the inner venting volume V. The duct 57 forms an elbow as illustrated in FIGS. 2 and 4. The heat transfer fluid is thus discharged from the inner venting volume V along arrow F3 depicted in FIG. 4, and returned to the duct 19 at elbow 31 and discharge segment 33. The discharge orifice 55 and the discharge duct 57 form means of discharging the heat transfer fluid outside the inner venting volume V, once this fluid has been degassed. The degassed heat transfer fluid is then returned to the heat transfer fluid circuit of the cooling system.

It is understood that in this configuration, the inner segment 29 constitutes a bypass for a fraction of the heat transfer fluid drawn into the tank 1. The value of this fraction is mainly a function of the ratio between the cross-sections of the transfer tube 47 and the inner segment 29.

Preferably, the inner segment 29 is dimensioned such that it takes up as little space as possible within the inner venting volume V, so that the inner venting volume V is as large as possible. For this, preferably the inner segment 29 is rectilinear, although other shapes could be considered.

The tank 1 finally comprises a partition 59 which protrudes upward from the bottom 5, being interposed between the dispensing orifice 53 and the discharge orifice 55. The partition 59 is formed by a central part 61 and two side parts 63, the parts 61 and 63 protruding from the bottom 5 in directions parallel to axis X51. The parts 63 are inclined relative to the part 61 so as to form a flat bottomed V-shape which surrounds and is spaced from the plunger tube 51 over at least a majority of its length measured parallel to axis X51. The partition 59 preferably rises to above the nominal level N, or above the plane defined by the edges 9 and 11. In this case, the central part 61 is arranged between the plunger tube 51 and the discharge orifice 55, being in contact with the plunger tube 51. The side parts 63 are themselves curved in a V-shape around the plunger tube 51 at a distance from the latter. The partition 59 thus forms a curved surface which the heat transfer fluid is forced to bypass in order to circulate from the dispensing orifice 53 to the discharge orifice 55. The heat transfer fluid is thus forced to follow the chicanes indicated by arrows F4 shown in FIG. 3, which promotes the good degassing of the heat transfer fluid within the inner venting volume V.

In general, the cooling system is designed to cool one or more elements of the vehicle. As a variant, the cooling system cools an internal combustion engine of the vehicle, this internal combustion engine serving for example for driving the vehicle.

The embodiments and variants described above may be combined to create new embodiments.

The invention claimed is:

1. A venting tank (1) for a cooling system of an automotive vehicle, the venting tank (1) comprising:
    a main wall (3), which defines an inner venting volume (V) of the venting tank, the main wall comprising a bottom (5) and a cover (7) opposite one another,
    an intake (45, 47, 49, 51, 53) for a heat transfer fluid to be vented within the inner venting volume,
    a discharge (55, 57) for discharging the vented heat transfer fluid from the inner venting volume, and
    a heat transfer fluid duct (19), which crosses through the cover (7) and the bottom (5) and comprises an inner segment (29) extending within the inner venting volume (V) from the cover (7) to the bottom (5);
    and whereof an inner volume (V29) of the inner segment is separated from the inner venting volume;
    wherein the intake provides a first fluid path from the inner segment to the inner venting volume (V);
    wherein the discharge provides a second fluid path from the inner venting volume to the heat transfer fluid duct (19), wherein the second fluid path is separate from the first fluid path; and
    wherein the inner segment is configured to form a bypass inside the venting tank so that only a fraction of the heat transfer fluid is conducted into the inner venting volume of the venting tank to be degassed, and a bypass fraction of the heat transfer fluid passes through the bypass without being degassed.

2. The venting tank (1) according to claim 1, wherein the inner segment (29) has a tubular shape and has a cross-section that defines an outer perimeter, the inner segment being separated from the main wall (3) over at least three quarters of the outer perimeter.

3. The venting tank (1) according to claim 1, wherein the inner segment (29) comprises:
    an upper tube (37), which comprises a first end (39), the upper tube extending within the inner venting volume (V) from the cover (7) to the first end, and
    a lower tube (41), which comprises a second end (43), the lower tube extending within the inner venting volume from the bottom (5) to the second end,
    the upper tube and the lower tube being connected to one another by means of the first end and the second end.

4. The venting tank (1) according to claim 3 wherein the upper tube (37) is integral with the cover (7) and the lower tube is integral with the bottom (5), the cover being attached on the bottom.

5. The venting tank (1) according to claim 3 wherein an outer diameter of the first end (39) is sized to fit within an inner diameter of the second end (41) or an outer diameter of the second end is sized to fit within an inner diameter of the first end in a manner that seals the connection between the first end and the second end.

6. The venting tank (1) according to claim 1 wherein the intake (45, 47, 49, 51, 53) comprises:
    a transfer orifice (45) in the inner segment (29),
    a dispensing orifice (53), which emerges in the inner venting volume (V), and
    a supply duct (47, 49, 51), which connects the transfer orifice to the dispensing orifice.

7. The venting tank (1) according to claim 6 wherein the supply duct (47, 49, 51) comprises:

an intermediate elbow (49) that is positioned in the inner venting volume, a transfer tube (47), which connects the transfer orifice (45) to the intermediate elbow and which has a cross-section whose diameter is smaller than a cross-section of the inner segment (29), and a plunger tube (51), which extends from the intermediate elbow to the dispensing orifice (53).

8. The venting tank (1) according to claim 1 wherein the discharge (55, 57) comprises:

a discharge orifice (55), which is located in the bottom (5), and a discharge duct (57), which connects the discharge orifice to the heat transfer fluid duct (19) outside the inner venting volume (V).

9. The venting tank (1) according to claim 1, further comprising a partition (59), which protrudes upward from the bottom (5) to a height above a nominal level (N) of the heat transfer fluid in the inner venting volume (V), interposed between the intake (45, 47, 49, 51, 53) and the discharge (55, 57) in the inner venting volume (V) such that heat transfer fluid is forced to follow a path around the partition to flow from the intake to the discharge.

10. An automotive vehicle comprising a cooling system for one or more members of the vehicle, said system in turn comprising a heat transfer fluid circuit and a venting tank (1) for the heat transfer fluid according to claim 1.

11. A venting tank for a cooling system of an automotive vehicle, the venting tank comprising:

a main wall defining an inner venting volume of the venting tank, the main wall comprising a bottom and a cover opposite one another;

a heat transfer fluid duct that crosses through the cover and the bottom and includes an inner segment passing within the inner venting volume from the cover to the bottom;

an intake defining a first fluid path from the inner segment to the inner venting volume for a heat transfer fluid to be vented within the inner venting volume;

a discharge defining a second fluid path from the inner venting volume back to the heat transfer fluid duct for discharging the vented heat transfer fluid from the inner venting volume, wherein the second fluid path is separate from the first fluid path; and wherein the inner segment is configured to form a bypass inside the venting tank so that only a fraction of the heat transfer fluid is conducted along the first fluid path into the inner venting volume of the venting tank to be degassed, and a bypass fraction of the heat transfer fluid passes through the bypass without entering the inner venting volume to be degassed, and vented heat transfer fluid that is discharged along the second fluid path rejoins the bypass fraction.

* * * * *